United States Patent [19]

Focke et al.

[11] Patent Number: 5,014,814
[45] Date of Patent: May 14, 1991

[54] SOUND-DAMPING MACHINE PARTS

[75] Inventors: Heinz Focke; Kurt Liedtke, both of Verden, Fed. Rep. of Germany

[73] Assignee: Focke & Co., Verden, Fed. Rep. of Germany

[21] Appl. No.: 72,481

[22] Filed: Jul. 13, 1987

[30] Foreign Application Priority Data

Jul. 24, 1986 [DE] Fed. Rep. of Germany ....... 3624986

[51] Int. Cl.⁵ ............................................ G10K 11/04
[52] U.S. Cl. .................................... 181/200; 181/293; 181/288
[58] Field of Search ................. 181/207–209, 181/285, 291, 292, 198, 201, 288, 293; 248/638, 666, 667; 310/327

[56] References Cited

U.S. PATENT DOCUMENTS

| 2,140,135 | 12/1938 | Landsiedel | 181/201 X |
| 2,960,189 | 11/1960 | Osburn | 181/207 X |
| 3,136,380 | 6/1964 | McCoy et al. | 181/292 X |
| 3,376,438 | 4/1968 | Colbert | 310/327 |
| 3,504,761 | 4/1970 | Sullivan et al. | 181/291 |
| 3,866,001 | 2/1975 | Kleinschmidt et al. | 181/285 |
| 3,866,708 | 2/1975 | Rudszinat et al. | 181/209 |
| 4,168,754 | 9/1979 | Nyholm | 181/207 X |
| 4,257,998 | 3/1981 | Diepenbrock, Jr. et al. | 181/293 X |
| 4,562,901 | 1/1986 | Junger et al. | 181/285 |

FOREIGN PATENT DOCUMENTS

| 291686 | 12/1969 | Austria . |
| 428508 | 10/1923 | Fed. Rep. of Germany . |
| 1162137 | 1/1964 | Fed. Rep. of Germany . |
| 1238821 | 4/1967 | Fed. Rep. of Germany . |
| 2457986 | 6/1976 | Fed. Rep. of Germany . |
| 2819123 | 11/1979 | Fed. Rep. of Germany . |
| 2155371 | 5/1973 | France . |
| 2408889 | 6/1979 | France . |
| 365890 | 1/1963 | Switzerland . |

OTHER PUBLICATIONS

DE-Z: Industrie-Anzeiger 95.Jg. Nr. 81a vol. 29., Sep. 1973, s. 1870–1873.

Primary Examiner—Brian W. Brown
Attorney, Agent, or Firm—Sughrue, Mion, Zinn, Macpeak & Seas

[57] ABSTRACT

Supporting machine parts (cheeks) and movable machine parts, especially levers of a machine are provided with interspaces and/or cavities (pores) for proofing against or the damping of sound vibrations or sound-generating vibrations, the interspaces and/or cavities being filled with a sound-proofing or sound-damping material.

11 Claims, 3 Drawing Sheets

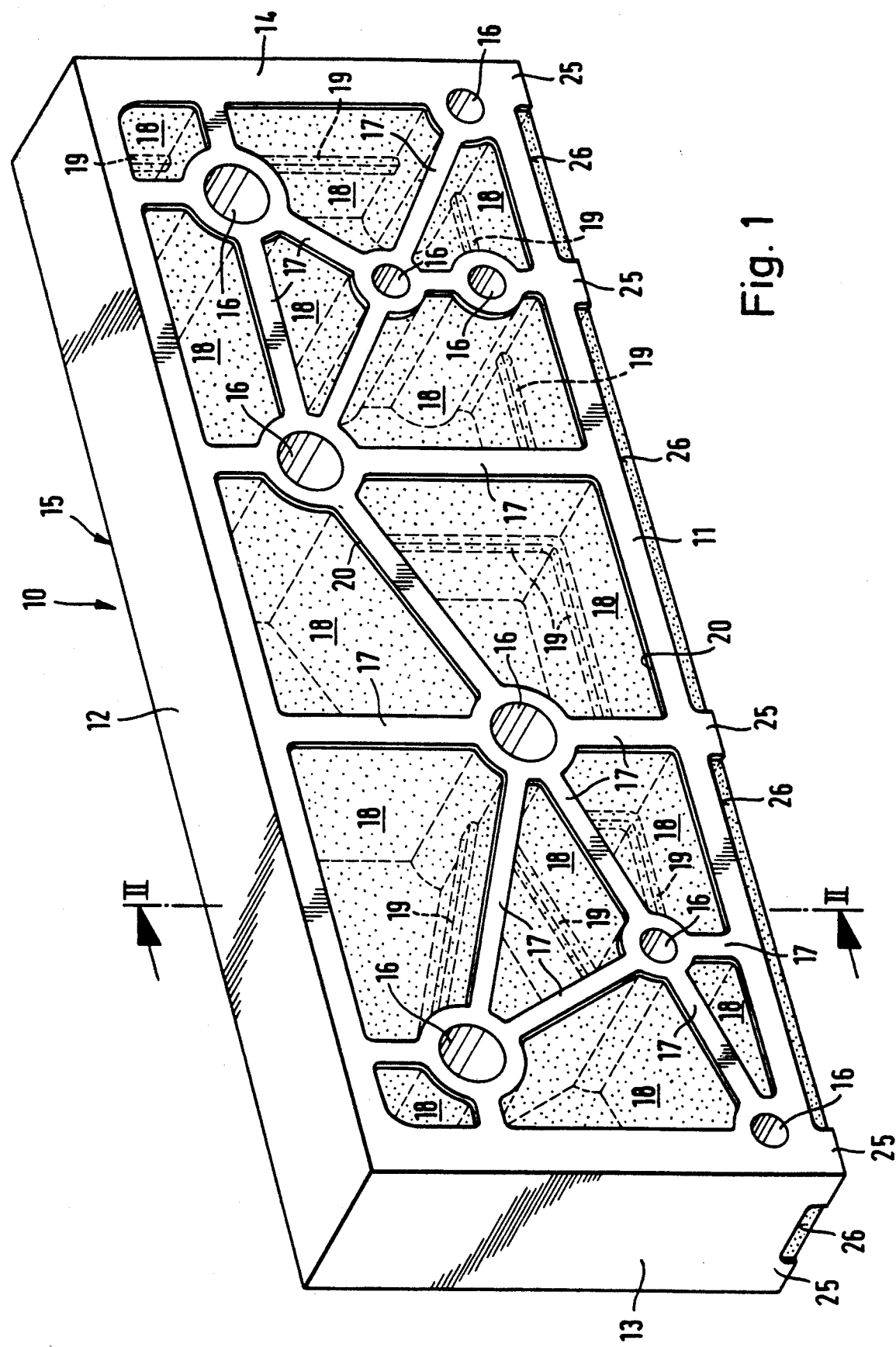

SOUND-DAMPING MACHINE PARTS

BACKGROUND OF THE INVENTION

The invention relates to sound-damping parts which are provided with interspaces and/or cavities filled with sound-proofing or sound-damping material.

Machines with movable machine parts are known to be sources of sound-generating vibrations. Attempts have been made, hitherto, to prevent such vibrations by applying sound-deadening coatings to plate-like machine parts or by means of so-called impedance jumps in the form of abrupt variations in cross-section or the fitting of shock-absorbing elements. It is also known to encase sound sources in housings equipped with sound-deadening coatings and thus prevent the sound from radiating outwards.

A disadvantage of the abovementioned measures is that the actual control of the generation of noise or of the sound-generating vibrations takes place too far away from the point of origin, and because of this it is often necessary to provide a costly and expensive casing for the corresponding machine.

SUMMARY OF THE INVENTION

Starting from the state of the art described, the object of the present invention is, therefore, to reduce the occurrence of sound-generating vibrations on fixed and movable machine parts to a minimum.

By providing interspaces and/or cavities (pores) containing sound-proofing or sound-damping materials, the propagation of structure-borne noise within the respective machine parts and the radiation of these vibrations are effectively prevented.

According to the invention, plate-like supporting machine parts are made lattice-like as a result of the provision of supporting webs 17. The supporting webs serve for bracing and retaining bearings (bearing lugs).

Alternatively, machine parts, especially plates, cheeks, etc., can be designed as cavities in a hollow body and filled with liquid or solid sound-proofing or sound-damping materials, for example water, oil or the like.

In a further particularly advantageous embodiment, the machine parts consist of a porous metallic material, especially sintered metal, the open pores being filled with hardenable sound-proofing or sound-damping material, especially plastic. By the use of sintered machine parts treated in this way, the propagation of sound-generating vibrations can be effectively prevented even at their point of origin. As a result, relatively small rotatable machine parts can be silent.

Further preferred embodiments are also disclosed.

Various embodiments of the invention are explained in detail below with reference to the accompanying drawings. In these:

BRIEF DESCRIPTION OF THE DRAWING

FIG. 1 shows a perspective representation of part of a machine, namely a cheek with bored bearing lugs for receiving the ends of movable machine parts.

DETAILED DESCRIPTION OF THE PREFERRED EMBODIMENTS

Figure 3:
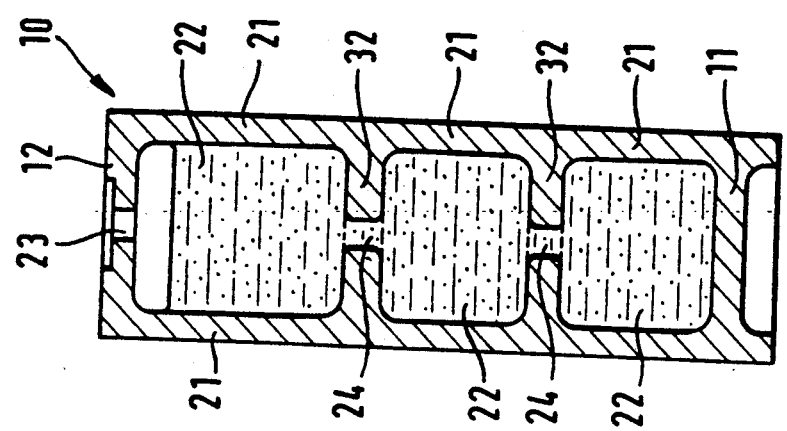
FIG. 3 shows a section through another embodiment of a machine part.

Sound-proofing or sound-damping measures on machines, especially packaging machines, can be applied, on the one hand, to stationary supporting machine parts, but on the other hand also to movable machine parts, in particular levers, links, etc.

According to FIG. 1, a cheek 10 for mounting shafts, journals or the like is designed as a latticework supporting structure. A bottom spar 11, a top spar 12 parallel to this and vertical side spars 13, 14 connecting these to one another form a supporting frame 15. Bearing lugs for receiving rotating machine parts, not shown here, are arranged inside this. The bearing lugs 16 are connected both to one another and to the supporting frame 15 via supporting webs 17. The dimensions of the supporting webs 17 are selected particularly from the point of view of statics or the loads exerted.. by the rotating machine parts mounted in the bored bearing lugs 16. For the same reason, individual bearing lugs 16 also have several supporting webs 17. The supporting frame 15, together with the bearing lugs 16 and supporting webs 17, is preferably produced as a casting or, as described in more detail further below, as a sintered article.

Between the supporting webs 17, the bearing lugs 16 and the supporting frame 15, there are interspaces 18 which are filled with a sound-proofing or sound-damping material. This material is represented by dots in FIG. 1. Advantageously, the material is selected so that both the generation and propagation of sound-generating vibrations (soundproofing) within the cheek 10 and the passage of sound vibrations (sound damping) through the cheek 10 are prevented. In a preferred embodiment, the interspaces 18 are filled with a flowable plastic which is hardenable after introduction. For example, a polyurethane elastomer is used here.

So that the sound-damping or sound-proofing material can be fixed within the cheek 10, the spars 11 to 14 are equipped, on their inner faces, with central ribs 19 projecting inwards. To improve fixing even further, the supporting webs 17 are also equipped with ribs 19 of this type, the ribs 19 being arranged so as to merge into one another. Since it is necessary to fix the soundproofing or sound-damping material only in a direction perpendicular to the main direction of extension of the cheek 10, the ribs 19 run essentially parallel to the spars 11 to 14 or to the supporting webs 17. The ribs 19 are surrounded by the sound-damping or sound-proofing material, so that the latter is held positively.

Figure 2:
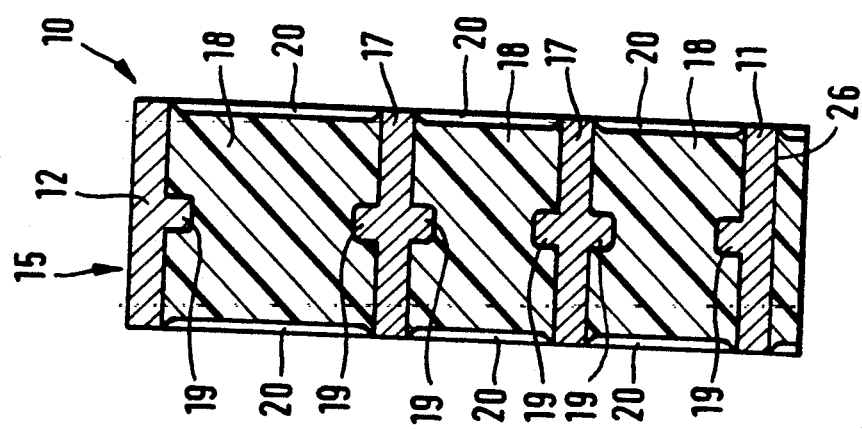
FIG. 2 shows a section through the machine part according to FIG. 1 along the line II—II in a form somewhat modified in relation to that of FIG. 1.

According to FIG. 2 the cheek 10, as seen in section along the line II—II, of FIG. 1 has inward-directed ribs 19 both on its top spar 12 and on the supporting webs 17 and the bottom spar 11. To prevent contact with rotatable machine parts, the material introduced into the interspaces 18 does not extend over the entire depth of the supporting frame 15 or of the spars 11 to 14. Residual spaces 20 in the interspaces 18 thus remain unfilled. This can also be achieved by using as a sound-proofing or sound-damping material a plastic which shrinks slightly during hardening.

FIG. 3 shows an alternative version. Here, a machine part, especially a cheek 10, is designed as a hollow body. By providing partition walls 32 which are horizontal in the exemplary embodiment illustrated, several cavities 22 are formed within the machine part, and these are filled with a sound-damping or sound-proofing material. Because the cavities 22 are closed by the front and rear walls 21 of the hollow body this material can also be a liquid, for example water, oil or the like. Bearings (bearing lugs) possibly arranged within this machine part are supported by the front and rear walls 21 of the machine part. However, even in this machine part shown in FIG. 3, supporting webs 17 along the lines of those of the exemplary embodiment according to FIGS. 1 and 2 can be additionally provided for bearing lugs.

The sound-damping or sound-proofing material is introduced into the interior of the machine part via an upper filling orifice 23. Intermediate bores 24 are made in the region of the partition walls 32, to allow the (flowable) material to flow across within chambers or cavities 22 of the machine part.

To prevent sound-generating vibrations from being transmitted from the machine part (cheek 10) to a supporting part foundation of a machine, in the exemplary embodiments according to FIGS. 1 to 3 the underside of the machine part (cheek 10) is equipped with downward-pointing stays 25 at the corners. Recesses 26 thereby formed between the stays 25 on the underside of the cheek 10 are likewise filled with sound-proofing or sound-damping material. This has a sound-damping or sound-proofing effect on the transmission of sound vibrations to substructures, foundations, etc.

Figure 4:
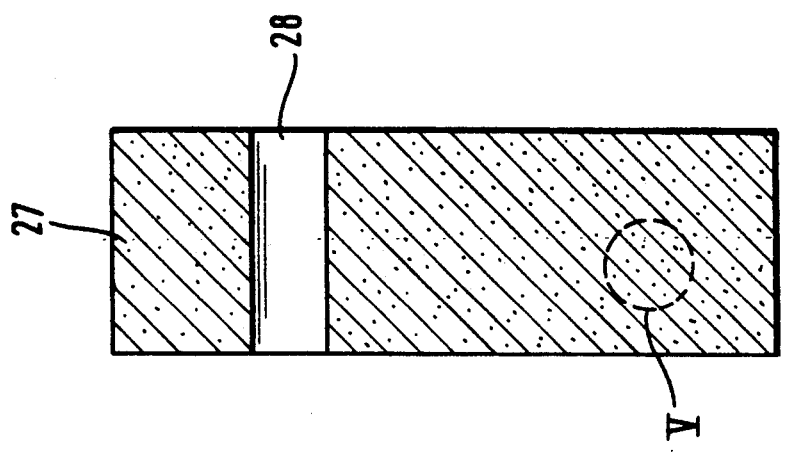
FIG. 4 shows a section through an embodiment of a machine part with a bearing bore.
Figure 5:
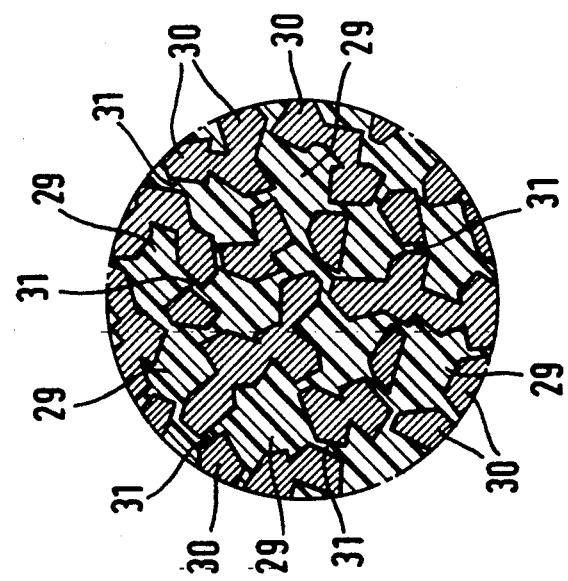
FIG. 5 shows a greatly enlarged representation of a cutout from FIG. 4 corresponding to the circle marked by V.

FIGS. 4 and 5 illustrate a further embodiment of a machine part. In a similar way to FIGS. 1 to 3, this can be a supporting machine part or a movable machine part. FIG. 4 shows, in cross-section, a movable machine part, in particular a link, a lever 27 or the like. The lever 27 is provided with a bearing bore 28. Here, soundproofing or sound damping is obtained by producing the lever 27 from a porous metallic material, in particular sintered metal. At the same time, by an appropriate adjustment of the parameters, pressure, temperature and pressing time or fusion time, the sintered material is designed so that the machine part has open pores 29 for receiving a flowable and hardenable sound-proofing or sound-damping material. Accordingly, the lever 27 is produced by sintering and subsequent immersion in a liquid hardenable plastic. Both thermoplastics and thermosetting plastics are suitable here. If a thermoplastic is used, this must be liquefied by means of heat, and the sintered machine part must be immersed in the thermoplastic. After the cooling of the machine part, the thermoplastic is also solidified and anchored firmly in the pores 29. FIG. 5 shows the material structure of the lever 27 in a greatly enlarged representation in comparison with that of FIG. 4. Here, the pores 29 are arranged between metal particles 30. The pores 29 are connected to one another by channels 31. The sintered machine part is immersed in the liquid sound-proofing and sound-damping material under a vacuum, in order to prevent air inclusions in the pores. The material can thus penetrate completely into all the pores 29 and channels 31 present. The sintered machine part produced in this way limits both the extent of sound-generating vibrations and the propagation of sound vibrations already generated.

The above-described possibilities of reducing sound vibrations in machine parts can also be combined with one another. Thus, it is likewise possible to produce cheeks 10 or other supporting machine parts in the design of FIGS. 1 to 3 from porous material (sintered metal), so that the sound-absorbing effect is increased.

We claim:

1. Machine part having longitudinal and transverse dimensions and comprising: a supporting plate (10) comprising a hollow body having a cavity and having longitudinally and transversely directed partition walls (32) forming subsidiary cavities (22) within said hollow body, said subsidiary cavities (22) being filled with a liquid sound-damping material; intermediate bores (24), in said partition walls (32), providing liquid communication among said subsidiary cavities (22); and a filling orifice (23) for introducing the liquid material into said cavity.

2. The machine part according to claim 1, wherein said hollow body consists of a porous sintered metal having open pores (29) filled with a hardenable sound-damping plastic material.

3. A sound-damping machine part for supporting rotating elements within a machine, said machine part comprising:
   a supporting frame (15);
   bored bearings lugs (16) inside said supporting frame (15);
   supporting webs (17) connecting the bearing lugs (16) to the supporting frame (15); and
   sound-damping material filling interspaces (18) formed within the supporting frame between the supporting webs (17) and between said supporting frame (15) and said supporting webs (17).

4. The machine part according to claim 3, wherein said machine part consists of a porous sintered metal having open pores (29) filled with a hardenable sound-damping plastic material.

5. The machine part according to claim 3 or 4, characterized in that the bearing lugs (16) are each held by means of several supporting webs (17) whose number and dimensions are determined in accordance with loads exerted on said supporting webs (17) by rotating machine parts mounted in said bearing lugs.

6. The machine part according to claim 4, characterized in that the supporting frame (15) consists of an interconnected top spar (12) and bottom spar (11) each directed horizontally and connected to one another by means of two vertical side spars (13, 14), within which the supporting webs (17) are arranged.

7. The machine part according to claim 6, characterized in that the machine part has stays (25) pointing downward on an underside of said machine part, recesses (26) between the stays (25) being filled with the sound-damping material, whereby the machine part is adapted to stand not on said underside, but on the stays (25) and the sound-damping material.

8. The machine part according to claim 6, characterized in that the frame (15), the support webs (17), and the bearing lugs (16) have noses for fixing the sound-damping material in the interspaces(18).

9. The machine part according to claim 1, 3 or 4 wherein the material is a plastic polyurethane elastomer which has a characteristic of being in a liquid state only for filling and being hardenable after filling.

10. The machine part according to claim 6, wherein the frame (15), the support webs(17), and the bearing lugs (16) have ribs (19) for fixing the sound-damping material in the interspaces (18).

11. The machine part according to claim 6, wherein the frame (15), the support webs (17), and the bearing lugs (16) have ribs (19) for fixing the sound-damping material in the interspaces (18).

* * * * *